(12) United States Patent
Griffith et al.

(10) Patent No.: US 12,141,562 B2
(45) Date of Patent: Nov. 12, 2024

(54) DECLARATIVE DEPLOYMENT OF A SOFTWARE ARTIFACT

(71) Applicant: MICROSOFT TECHNOLOGY LICENSING, LLC, Redmond, WA (US)

(72) Inventors: Jeffery Griffith, Rosemere (CA); Kenneth William Douglas Smith, London (GB); Fabrizio Lussana, Turin (IT); Andreas Martin Krause, Hannover (DE)

(73) Assignee: Microsoft Technology Licensing, LLC., Redmond, WA (US)

( * ) Notice: Subject to any disclaimer, the term of this patent is extended or adjusted under 35 U.S.C. 154(b) by 170 days.

(21) Appl. No.: 17/674,477

(22) Filed: Feb. 17, 2022

(65) Prior Publication Data
US 2023/0259345 A1   Aug. 17, 2023

(51) Int. Cl.
| | |
|---|---|
| G06F 9/44 | (2018.01) |
| G06F 8/61 | (2018.01) |
| G06F 8/71 | (2018.01) |
| G06F 9/445 | (2018.01) |
| G06F 9/455 | (2018.01) |
| G06N 20/00 | (2019.01) |

(52) U.S. Cl.
CPC .................. *G06F 8/61* (2013.01); *G06F 8/71* (2013.01); *G06N 20/00* (2019.01)

(58) Field of Classification Search
CPC .... G06F 8/60; G06F 8/61; G06F 8/71; G06N 20/00
See application file for complete search history.

(56) References Cited

U.S. PATENT DOCUMENTS

| | | | | |
|---|---|---|---|---|
| 11,029,943 | B1 * | 6/2021 | Delchev | G06F 8/656 |
| 11,573,786 | B1 * | 2/2023 | Kiselev | G06F 8/10 |
| 2019/0129701 | A1 * | 5/2019 | Hawrylo | G06F 8/71 |

(Continued)

FOREIGN PATENT DOCUMENTS

| | | | | |
|---|---|---|---|---|
| CN | 114036054 A | * | 2/2022 | G06F 11/3608 |
| EP | 3511824 A1 | * | 7/2019 | G06F 11/3608 |

OTHER PUBLICATIONS

Benedikt Koller, A case for declarative configurations for ML training, 2020, pp. 1-5. https://cd.foundation/blog/2020/05/29/a-case-for-declarative-configurations-for-ml-training/ (Year: 2020).*

(Continued)

*Primary Examiner* — Mongbao Nguyen
(74) *Attorney, Agent, or Firm* — Foley IP Law, PLLC

(57) ABSTRACT

There is provided a method that includes (a) scanning a repository to identify an artifact that is available in the repository, (b) producing a declaration that indicates that the artifact is to be installed on a target device, (c) querying the target device to obtain information about a present state of the artifact on the target device, thus yielding state information, (d) determining, from a comparison of the state information to the declaration, that the artifact on the target device is not up to date, and (e) deploying the artifact from the repository, and a serving program, to the target device. There is also provided a system that performs the method, and a storage device that contains instructions for a processor to perform the method.

18 Claims, 4 Drawing Sheets

100

(56) References Cited

U.S. PATENT DOCUMENTS

| | | | | |
|---|---|---|---|---|
| 2021/0011688 A1* | 1/2021 | Sasidharan | ............... | G06F 8/10 |
| 2021/0019135 A1* | 1/2021 | Hwang | ................. | G06F 9/4881 |
| 2021/0173760 A1* | 6/2021 | Downie | ............. | G06F 11/3664 |
| 2021/0224107 A1* | 7/2021 | Vassenkov | .......... | G06F 11/1469 |
| 2022/0405092 A1* | 12/2022 | Miedema | ................. | G06F 8/60 |
| 2023/0069485 A1* | 3/2023 | Huruli | ...................... | G06F 8/63 |
| 2023/0076276 A1* | 3/2023 | Parthasarathi | ...... | G06F 9/44505 |
| 2023/0132501 A1* | 5/2023 | Phillippe | ............. | G06F 11/3688 |
| | | | | 714/38.1 |
| 2023/0133312 A1* | 5/2023 | O'Connor | ................ | G06F 8/61 |
| | | | | 717/174 |
| 2023/0168872 A1* | 6/2023 | Hang | ................. | G06F 9/44505 |
| | | | | 715/762 |

OTHER PUBLICATIONS

Aquilas Tchanjou Njomou, MSR4ML: Reconstructing Artifact Traceability in Machine Learning Repositories, 2021, pp. 1-5. https://ieeexplore.ieee.org/stamp/stamp.jsp?tp=&arnumber=9426012 (Year: 2021).*

Hui Miao, Towards Unified Data and Lifecycle Management for Deep Learning, 2016, pp. 1-13. chrome-extension://efaidnbmnnnibpcajpcglclefindmkaj/https://arxiv.org/pdf/1611.06224 (Year: 2017).*

CD Foundation, A case for declarative configurations for ML training, 2020, pp. 1-5. https://cd.foundation/blog/2020/05/29/a-case-for-declarative-configurations-for-ml-training/ (Year: 2020).*

* cited by examiner

DECLARATIVE DEPLOYMENT OF A SOFTWARE ARTIFACT

BACKGROUND OF THE DISCLOSURE

1. Field of the Disclosure

The present disclosure relates to a method and a system for deployment of a software artifact. The method and system are particularly well-suited for deployment of a machine learning model.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

An artifact is a software object such as a data file or an executable program module.

The current state-of-the art for altering and deploying computer software follows this common cycle: 1) modify software, 2) compile, test, and version the software, and 3) specify configuration information that dictates how the software behaves in a specific environment, e.g., a computer or a cluster of computers. These steps are termed 'imperative' in nature because they are well defined steps for producing computer programs. Within the industry, tools relating to this common cycle fall into a category termed 'Continuous Integration' because they automate this process of producing artifacts.

Once these artifacts are produced, the current state-of-the-art in tooling, generally falling under the term 'Continuous Deployment', combine the artifacts and configuration information from step 3 above to install the program artifacts onto their ultimate deployment environment, e.g., a computer or cluster of computers, often as a service, which makes the functionality of the program available via a network. In modern environments where software is run in large clusters of computers, the steps for performing this deployment of software are no longer considered imperative, i.e., the software is not installed via a sequence of steps implemented via human intervention. Instead, the artifacts (programs) and configuration act as a 'declaration' of the content, location, and behavior of how artifacts are deployed, and the tooling automatically synchronizes target computer clusters with this declaration of content and target location.

Although the above processes work well when installing basic software that may access a database for its information, the field of machine learning poses a particular problem for existing tools for deploying computer software. In traditional programming, a program takes data as input and produces answers. In the field of machine learning, input data and known answers are used to create programs, however the "program" is not the traditional idea of a program. It is a combination of a large data file that is the result of machine learning, plus a generic computer program capable of using the data file, and many others, to produce outputs. As a result, the generality of that computer program may be paired with many separate data files during installation to produce what appear from the outside as many different programs or services, but in reality, are the result of pairing a single, more general program with many input files that embed the true logic produced during machine learning.

Continuous deployment tools that are presently available do not conveniently facilitate this coupling of the generic computer program with its domain-specific data file during the installation process.

SUMMARY OF THE DISCLOSURE

There is provided a method that includes (a) scanning a repository to identify an artifact that is available in the repository, (b) producing a declaration that indicates that the artifact is to be installed on a target device, (c) querying the target device to obtain information about a present state of the artifact on the target device, thus yielding state information, (d) determining, from a comparison of the state information to the declaration, that the artifact on the target device is not up-to-date, and (e) deploying the artifact from the repository, and a serving program, to the target device. There is also provided a system that performs the method, and a storage device that contains instructions for a processor to perform the method.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
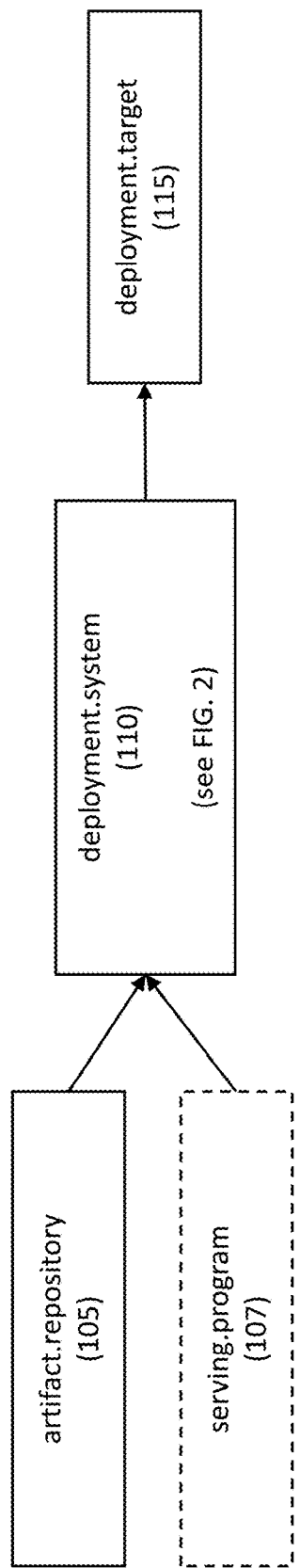
FIG. 1 is a block diagram of a system for deployment of a software artifact.

FIG. 1 is a block diagram of a system, namely system 100, for deployment of a software artifact. System 100 includes an artifact.repository 105, a serving.program 107, a deployment.system 110, and a deployment.target 115, each of which is typically implemented on a server.

Artifact.repository 105 is a file repository that organizes artifacts in a structured hierarchy so that deployment.system 110 can monitor its content. An example of artifact.repository 105 is a web server with well-structured content that contains artifacts such as data files and computer programs.

Serving.program 107 is a generalized computer program that when paired alongside an artifact from artifact.repository 105, can be installed on deployment.target 115. In traditional programming, a program takes data as input and produces answers using its embedded, pre-programmed logic. In the field of machine learning, however, in a phase known as "training" input data and known answers are used to create artifacts that replace the traditional idea of a program by storing the program logic into a data file and, in the context of system 100, an artifact in artifact.repository 105. Serving.program 107 is capable of reading these artifacts to produce results when given input data.

Deployment.system 110 automates and verifies the deployment of artifacts, e.g., machine learning models, by automatically scanning the content of artifact.repository 105 and ensuring they, i.e., artifacts, are installed alongside serving.program 107 on deployment.target 115. Deployment.system 110 compares the artifacts stored in artifact.repository 105 to those already installed on deployment.target 115, and where it finds a discrepancy, takes the actions necessary to synchronize deployment.target 115 with artifact.repository 105. This form of deployment is termed "declarative" since artifact.repository 105 serves as a declaration for what should be made available on deployment.target 115. Deployment.system 110 runs on a server that performs the deployment process, but is separate from the server dedicated to deployment.target 115. Deployment.system 110 is further described below, with reference to FIG. 2.

Deployment.target 115 is a device that contains one or more instantiations of artifacts running as data in one or more instances of serving.program 107. Deployment.target 115 could be any sort of computer, but a typical example would be a cluster of servers where many instances of a computer program are required to provide high availability of the program's functionality.

Figure 2:
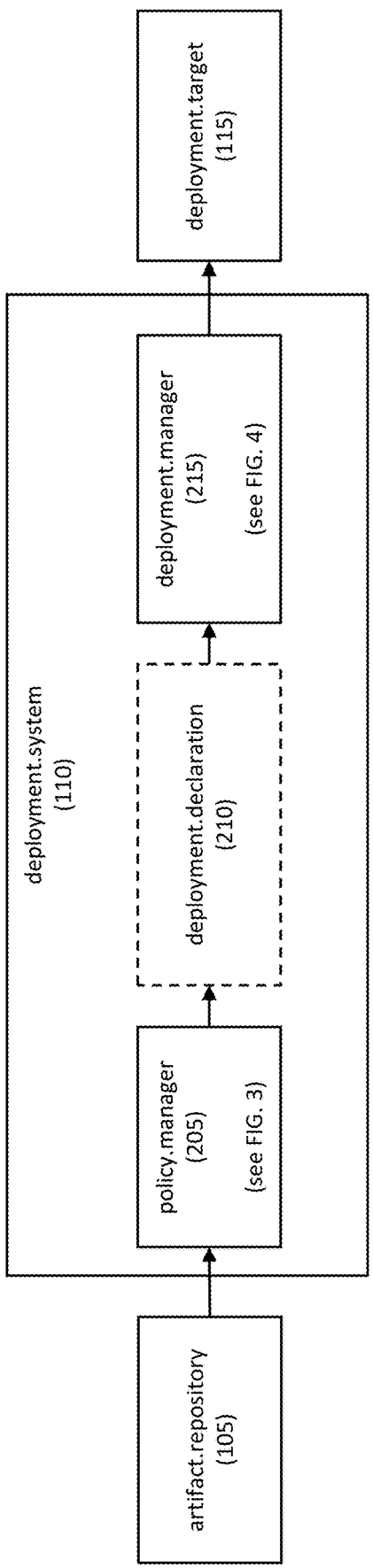
FIG. 2 is a block diagram of a deployment system that is a component of the system of FIG. 1.

FIG. 2 is a block diagram of deployment.system 110. Deployment.system 110 ensures that artifacts are properly deployed from artifact.repository 105 to deployment.target 115. Deployment.system 110 includes a policy.manager 205, a deployment.declaration 210, and a deployment.manager 215.

Policy.manager 205 scans artifact.repository 105 to obtain a list of artifacts available therein, and produces deployment.declaration 210. Policy.manager 205 is further described below, with reference to FIG. 3.

Deployment.declaration 210 is a set of instructions concerning which specific artifacts are to be made available to deployment.target 115.

Deployment.manager 215 receives deployment.declaration 210, and based thereon, deploys the specific artifacts to deployment.target 115. Deployment.manager 215 is further described below, with reference to FIG. 4.

Figure 3:
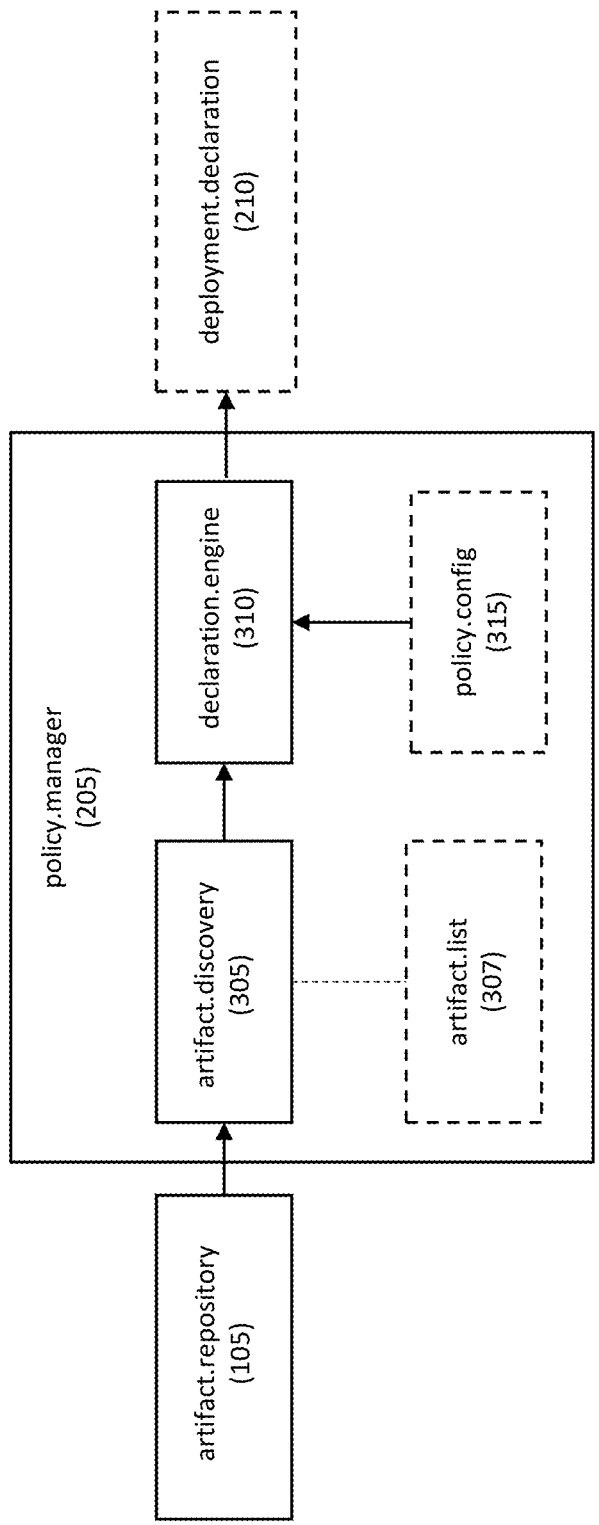
FIG. 3 is a block diagram of a policy manager that is a component of the deployment system of FIG. 2.

FIG. 3 is a block diagram of policy.manager 205. Policy.manager 205 includes an artifact.discovery 305, a declaration.engine 310, and a policy configuration, i.e., policy.config 315.

Artifact.discovery 305 periodically scans artifact.repository 105, maintains a list, namely artifact.list 307, of artifacts available in artifact.repository 105, and provides artifact.list 307 to declaration.engine 310.

Policy.config 315 defines which of the artifacts found in the artifact.list 307 are to be considered for installation on deployment.target 115. One item in the policy, for example, may state that we only want to use the latest version of a given artifact to be installed whereas another artifact may require the previous two versions be installed. This is not to be confused with deployment.config 415 (described below) which describes "how" instead of "whether" an artifact is installed.

Declaration.engine 310 consults policy.config 315 to determine whether each artifact in artifact.list 307, and thus in artifact.repository 105, is ultimately to be deployed to deployment.target 115.

Declaration.engine 310 outputs deployment.declaration 210, which can be acted upon in subsequent processing.

Figure 4:
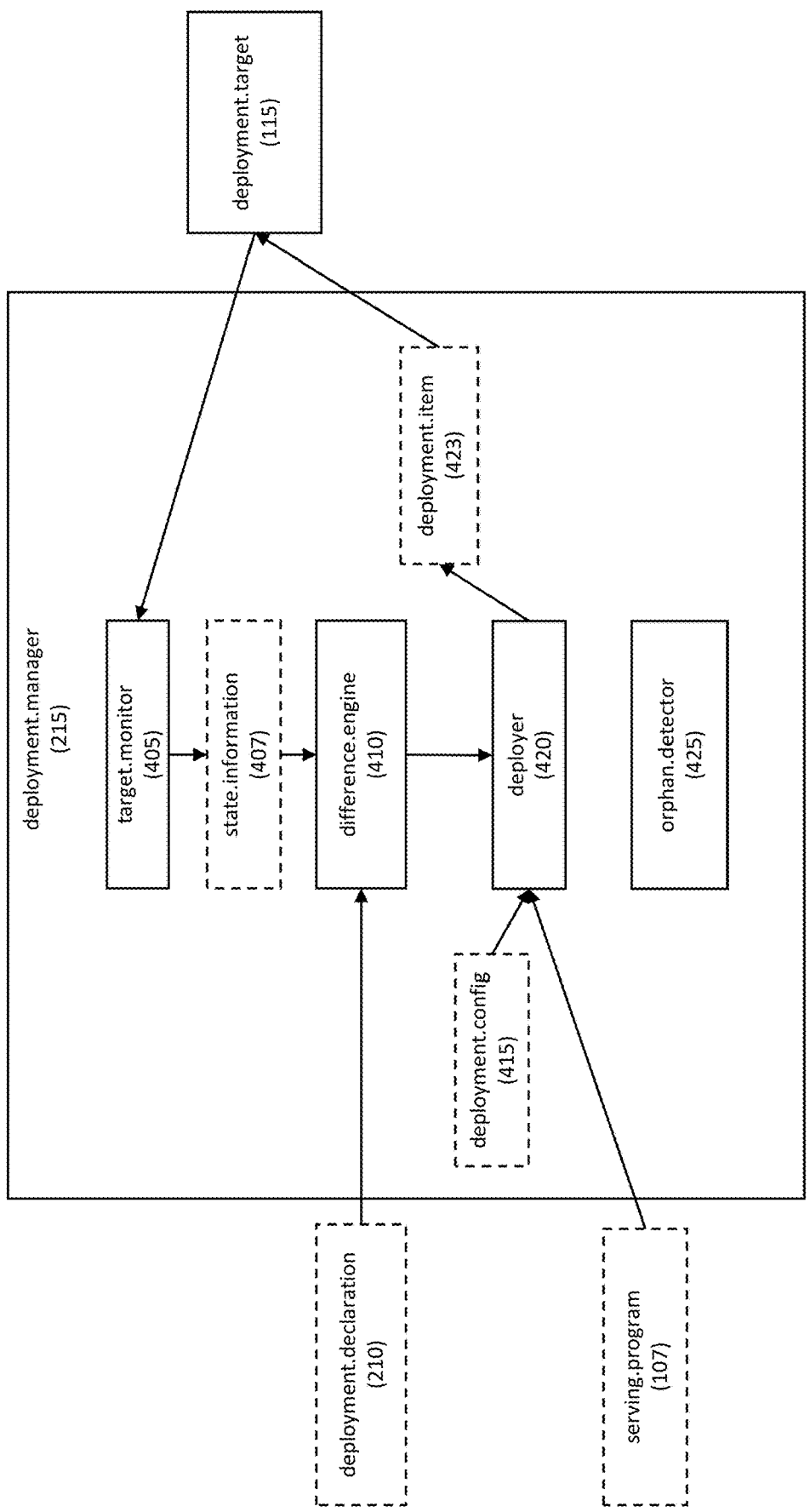
FIG. 4 is a block diagram of a deployment manager that is a component of the deployment system of FIG. 2.

FIG. 4 is a block diagram of deployment.manager 215. Deployment.manager 215 includes a target.monitor 405, a difference.engine 410, a deployment configuration, i.e., deployment.config 415, a deployer 420, and an orphan.detector 425. Deployment.manager 215 receives deployment.declaration 210, and ultimately deploys artifacts to deployment.target 115.

Target.monitor 405 queries deployment.target 115 to obtain information about a present state of artifacts on deployment.target 115. Target.monitor 405 saves this information in state.information 407.

Difference.engine 410 compares deployment.declaration 210 to state.information 407, i.e., the current state of deployment.target 115. If difference.engine 410 finds a difference between deployment.declaration 210 and state.information 407, difference.engine 410 concludes that an artifact on deployment.target 115 is not up-to-date, and thus invokes deployer 420.

Deployment.config 415 contains configuration information on how an artifact gets installed on the deployment.target 115. This includes information that identifies the scale of the deployment (the number of instances running) as well as the amount of resources (CPU, memory, etc.) that may be allocated to it. Compare this to policy.config 315, which declares which artifacts are to be made available, rather than how they are to be installed.

A deployment.item 423 is a pairing of serving.program 107 and an artifact from artifact.repository 105 that is to be installed on deployment.target 115. The many possible pairings of serving.program 107 and artifacts produce many possible deployment items, each with its own behavior when installed on deployment.target 115.

Deployer 420 reads deployment.config 415 to obtain configuration that describes how an artifact undergoing deployment will update deployment.target 115 to implement deployment.declaration 210. Deployer 420 pairs serving.program 107 and the artifact into deployment.item 423. and then installs deployment.item 423 onto the deployment.target 115.

After deployer 420 has updated deployment.target 115, target.monitor 405 obtains an updated status of deployment.target 115 from deployment.target 115, and saves the updated status as state.information 407.

When all artifacts have been synchronized with deployment.target 115, an auxiliary action is taken, namely the invocation of orphan.detector 425.

Orphan.detector 425 considers the content of policy.config 315 and the final state of deployment.target 115 made available by target.monitor 405 in state.information 407, and produces a report of artifacts installed on deployment.target 115 that are extraneous or undesired. For example, an artifact may have been deleted from artifact.repository 105, but not yet removed from deployment.target 115. The discrepancies are recorded in the output of the execution (website update, email, etc.). Deletion of artifacts from deployment.target 115 may be performed automatically, or as a manual operation to reduce the risk of unwanted mass deletions from deployment.target 115 due to a configuration error.

Example 1

For this example, artifacts include version information in their titles, e.g., 1.0.0 and 1.0.1. Version 1.0.1 represents a patch update to version 1.0.0.

Assume artifact.repository 105 contains:
artifactA-1-0-0
artifactA-1-0-1

Operation 1-1. Policy.manager 205 periodically reads the content of artifact.repository 105 and maintains artifact.list 307.

Thus, artifact.list 307 lists:
artifactA-1-0-0
artifactA-1-0-1

Operation 1-2. As mentioned above, policy.config 315 defines which of the artifacts found in the artifact.list 307 are to be considered for installation on deployment.target 115. Declaration.engine 310 consults policy.config 315 to determine whether each artifact in artifact.list 307 is ultimately to be deployed to deployment.target 115.

Assume policy.config 315 indicates:
artifactA: deploy-only-latest-version

Declaration.engine 310 accepts the list of artifacts, artifact.list 307, and the policy configuration relevant for those artifacts, i.e., policy.config 315, and produces deployment.declaration 210. In this example, since policy.config 315 indicates "artifactA: deploy-only-latest-version", artifactA-1-0-0 is not to be deployed since only the latest version, artifactA-1-0-1, is to be deployed.

Thus, deployment.declaration 210 indicates:
deploy: artifactA-1-0-1

Operation 1-3. Target.monitor 405 queries deployment.target 115 to obtain the current status of deployment.target 115, and saves the current status as state.information 407. For example, assume deployment.target 115 presently has artifactA-1-0-0 and artifactB-1-0-0 installed thereon. Accordingly, target.monitor 405 will update state.information 407.

Thus, state.information 407 indicates:
artifactA-1-0-0
artifactB-1-0-0

Note that in operation 1-1, artifact.repository 105 did not include artifactB-1-0-0. Thus, policy.manager 205 did not find artifactB-1-0-0 in artifact.repository 105, and policy.manager 205 did not include artifactB-1-0-0 in artifact.list 307.

Also, recall that a program installed on deployment.target 115 is a pairing of serving.program 107 and an artifact, as a deployment.item 423. As such, in operation 1-3, state.information 407 is implying that deployment.target 115 presently includes deployment.items 423 configured as (a) serving.program 107+artifactA-1-0-0, and (b) serving.program 107+artifactB-1-0-0.

Operation 1-4. Difference.engine 410 compares deployment.declaration 210 to state.information 407, i.e., the current state of deployment.target 115. Difference.engine 410 recognizes that artifactA-1-0-1 is not installed on deployment.target 115, and so, difference.engine 410 invokes deployer 420 with artifactA-1-0-1.

Operation 1-5. As mentioned above, deployment.config 415 contains configuration information on how an artifact gets installed on the deployment.target 115. Deployer 420 reads deployment.config 415 to obtain configuration information that is relevant to the artifact undergoing deployment, then effects the changes to deployment.target 115 to implement deployment.declaration 210 by sending it a deployment.item 423 that contains serving.program 107 paired with artifactA-1-0-1.

Assume deployment.config 415 indicates:
artifactA:
  deploy with autoscaling
  deploy with a minimum of 5 instances of this artifact available for use
  deploy with increased central processing unit (CPU) and memory resources Deployer 420 installs deployment.item 423 (i.e., serving.program 107+artifactA-1-0-1) as its input onto deployment.target 115. In this example, per policy.config 315, deployer 420 will replace the old deployment.item 423 (i.e., serving.program 107+artifactA-1-0-0) with the newer pairing, thus updating deployment.target 115. Per deployment.config 415, the number of running instances of this deployment.item 423 should be configured on deployment.target 115 such that they increase and decrease according to demand. Likewise, per deployment.config 415, deployment.target 115 should ensure that at least 5 instances of deployment.item 423 remain running and that they have augmented CPU and memory resources.

Operation 1-6. After deployer 420 has updated deployment.target 115, target.monitor 405 obtains an updated status of deployment.target 115, from deployment.target 115, and saves the updated status as state.information 407.

Thus, state.information 407 indicates:
artifactA-1-0-1
artifactB-1-0-0

Operation 1-7. Orphan.detector 425 considers the latest output of target.monitor 405, i.e., state.information 407, and the content of policy.config 315. Recall that for the present example, policy.config 315 indicates only "artifactA: deploy-only-latest-version". Accordingly, orphan.detector 425 logs the fact that artifactB-1-0-0 was found to be installed, but according to the policy.config 315, should not be in service. Deployment.target 115 can then be directed to uninstall the instance of artifactB-1-0-0.

Example 2

Assume that machine learning techniques have been applied to create two neural networks capable of recognizing the breed of cats and dogs, and stored these neural networks in data files as artifacts in artifact.repository 105. These artifacts are created separately and intended to function independently. They also carry version information in their title, e.g., 1.0.0 and 1.0.1. Version 1.0.1 represents a patch update to version 1.0.0.

Assume artifact.repository 105 contains:
cats-1-0-0
cats-1-0-1
dogs-1-0-0

Operation 2-1. Policy.manager 205 periodically reads the content of artifact.repository 105 and prepares artifact.list 307.

Thus, artifact.list 307 lists:
cats-1-0-0
cats-1-0-1
dogs-1-0-0

Operation 2-2. As mentioned above, policy.config 315 defines which of the artifacts found in the artifact.list 307 are to be considered for installation on deployment.target 115. Declaration.engine 310 consults policy.config 315 to determine how each artifact in artifact.list 307, and thus in artifact.repository 105, is ultimately to be deployed to deployment.target 115.

Assume policy.config 315 indicates:
cats: deploy-only-latest-version
dogs: deploy-only-latest-version Declaration.engine 310 accepts the list of artifacts, i.e., artifact.list 307, and the policy configuration relevant for those artifacts, i.e., from policy.config 315, and produces deployment.declaration 210. In this example, policy.config 315 dictates that cats-1-0-0 is not to be deployed since only the latest version, i.e., cats-1-0-1, is to be used.

Thus, deployment.declaration 210 indicates:
deploy: cats-1-0-1
deploy: dogs-1-0-0

Operation 2-3. Target.monitor 405 queries deployment.target 115 to obtain the current status of deployment.target 115, and saves the current status as state.information 407. For example, assume deployment.target 115 presently has cats-1-0-0 and birds-1-0-0 installed thereon. Accordingly, target.monitor 405 will update state.information 407.

Thus, state.information 407 indicates:
cats-1-0-0
birds-1-0-0

Recall that a program installed on deployment.target 115 is a pairing of serving.program 107 and an artifact, as a deployment.item 423. As such, in operation 2-3, state.information 407 is implying that deployment.target 115 presently includes deployment.items 423 configured as (a) serving.program 107+cats-1-0-0, and (b) serving.program 107+birds-1-0-0.

Operation 2-4. Difference.engine 410 compares deployment.declaration 210 to state.information 407, i.e., the current state of deployment.target 115. Difference.engine 410 recognizes that neither cats-1-0-1 nor dogs-1-0-0 is installed on deployment.target 115, and so, difference.engine 410 invokes deployer 420 with cats-1-0-1 and dogs-1-0-0.

Operation 2-5. As mentioned above, deployment.config 415 contains configuration information on how an artifact gets installed on the deployment.target 115. Deployer 420 reads deployment.config 415 to obtain configuration information that is relevant to the artifact(s) undergoing deployment, then effects the changes to deployment.target 115 to implement deployment.declaration 210.

Assume deployment.config 415 indicates:
cats:
  deploy with autoscaling
  deploy with a minimum of 5 instances of this artifact available for use
  deploy with increased central processing unit (CPU) and memory resources
dogs:
  deploy with exactly 10 running instances of this program According to state.information 407, a deployment.item 423 configured of serving.program 107+cats-1-0-0 is presently installed on deployment.target 115. Note that there is NO instance of a deployment.item 423 configured of serving.program 107+dogs-1-0-0. Deployer 420 therefore replaces the deployment.item 423 configured of serving.program 107+cats-1-0-0 with a deployment.item 423 configured of serving.program 107+cats-1-0-1. Deployer 420 also installs a deployment.item 423 configured of serving.program 107+dogs-1-0-0 since this was not present on deployment.target 115. This brings deployment.target 115 up to date according to deployment.declaration 210.

During the deployment, deployment.config 415 is taken into consideration as well. In this example serving.program 107+cats-1-0-1 is deployed such that deployment.target 115 will automatically increase and decrease the number of running instances of the deployment item according to demand. Similarly, the number of running instances of serving.program 107+dogs-1-0-0 should be exactly 10.

Operation 2-6. After deployer 420 has updated deployment.target 115, target.monitor 405 obtains the updated status of deployment.target 115 from deployment.target 115, and saves the updated status as state.information 407.

Thus, state.information 407 indicates:
cats-1-0-1
dogs-1-0-0
birds-1-0-0

Operation 2-7. Orphan.detector 425, considers the latest output of target.monitor 405, i.e., state.information 407, and the content of policy.config 315. Recall that for the present example, policy.config 315 indicates "cats: deploy-only-latest-version" and "dogs: deploy-only-latest-version". Accordingly, orphan.detector 425 logs the fact that birds-1-0-0 was found to be installed, but according to policy.config 315, should not be in service.

Each of artifact.repository 105, deployment.system 110 and deployment.target 115 is a device that includes electronic circuitry that performs operations to execute methods or processes described herein. The circuitry may be implemented with any or all of (a) discrete electronic components, (b) firmware, or (c) a programmable circuit that includes a processor and a memory. Such a processor is an electronic device configured of logic circuitry that responds to and executes instructions. Such a memory is a tangible, non-transitory, computer-readable storage device encoded with a computer program. In this regard, the memory stores data and instructions, i.e., program code, that are readable and executable by the processor for controlling operations of the processor. The memory may be implemented in a random-access memory (RAM), a hard drive, a read only memory (ROM), or a combination thereof.

Such a processor and memory may be implemented in a computer. The computer can be a standalone device or coupled to other devices in a distributed processing system.

Additionally, the program code may be configured on a storage device for subsequent loading into the memory. Such a storage device is a tangible, non-transitory, computer-readable storage device, and examples include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled the components of system 100 via a data network, e.g., the Internet.

The program code may be configured in one or more modules. The term "module" is used herein to denote a functional operation that may be embodied either as a stand-alone component or as an integrated configuration of a plurality of subordinate components. Thus, a module may be implemented as a single module or as a plurality of sub-ordinate modules that operate in cooperation with one another.

The processes described herein, as compared to the prior art, reduce the complexity of how artifacts, which may number in the hundreds or thousands, are deployed onto their target computer systems. By automating the installation of a general-purpose program, i.e., serving.program 107, each with its own input artifact, the burden of managing the large number of artifacts as separate programs is removed.

In review, in an exemplary method, deployment.system 110 performs operations of:
(a) artifact.discovery 305 scanning artifact.repository 105 to identify an artifact that is available in artifact.repository 105;
(b) declaration.engine 310 producing a deployment.declaration 210 that indicates that the artifact is to be installed on deployment.target 115;
(c) target.monitor 405 querying deployment.target 115 to obtain information about a present state of the artifact on deployment.target 115, thus yielding state.information 407;
(d) difference.engine 410 determining, from a comparison of state.information 407 to deployment.declaration 210, that the artifact on deployment.target 115 is not up to date; and
(e) deployer 420 deploying (i) the artifact from artifact.repository 105, and (ii) serving.program 107, to deployment.target 115.

Producing deployment.declaration 210 includes declaration.engine 310 (a) obtaining policy.config 315 concerning whether the artifact in artifact.repository 105 is to be installed, and (b) preparing deployment.declaration 210 in accordance with policy.config 315.

Additionally, the exemplary method includes (a) target-.monitor 405 querying deployment.target 115 to obtain information about an updated state of the artifact on deployment.target 115, thus yielding updated state.information 407, and (b) difference.engine 410 determining from the updated state.information 407, in view of policy.config 315, that deployment.target 115 includes an extraneous artifact.

Deploying the artifact from artifact.repository 105 and serving.program 107 to deployment.target 115 includes deployer 420 obtaining deployment.config 415, where serving.program 107 is installed with the artifact from artifact.repository 105 onto deployment.target 115 in accordance with deployment.config 415.

Also, in the exemplary method, the artifact from artifact.repository 105 is a machine learning model.

System 100 facilitates and simplifies the deployment and management of a large number of data files (artifacts) that embed the logic of a program's functionality in data as with a neural network that is wrapped in a generic serving program capable of interpreting and using the data files. Prior art deployment tooling does not pair data artifacts, such as neural networks, with a generic serving program, and therefore results in an explosion in the number of "programs" to manage.

The techniques described herein are exemplary, and should not be construed as implying any particular limitation on the present disclosure. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations, or components, but not precluding the presence of one or more other features, integers, operations or components or groups thereof. The terms "a" and "an" are indefinite articles, and as such, do not preclude embodiments having pluralities of articles.

What is claimed is:

1. A computer-implemented method comprising:
   scanning a repository to identify an updated artifact stored in the repository, the updated artifact storing data for running a neural network;
   producing a declaration that indicates that the updated artifact is to be installed on a target device;
   querying the target device to obtain state information associated with an outdated artifact stored on the target device, the outdated artifact being an earlier version of the updated artifact, wherein an outdated program installed on the target device pairs the outdated artifact with an outdated serving program for interpreting and using the updated artifact;
   determining, from a comparison between the state information and the declaration, that the outdated artifact stored on the target device is not up to date; and
   deploying, to the target device, a deployment item pairing the updated artifact with an updated serving program for interpreting and using the data stored by the updated artifact to run the neural network, the deployment item prompting installation of both the updated artifact and the updated serving program to run the neural network as a new program on the target device.

2. The computer-implemented method of claim 1, wherein the updated serving program is separate and distinct from the updated artifact.

3. The computer-implemented method of claim 1, wherein producing the declaration comprises:
   preparing the declaration in accordance with policy configuration information.

4. The computer-implemented method of claim 1, further comprising:
   querying the target device to obtain updated state information after deploying the deployment item.

5. The computer-implemented method of claim 4, further comprising:
   determining that the target device includes an extraneous artifact based on the updated state information and the policy configuration information.

6. The computer-implemented method of claim 5, wherein the extraneous artifact is deleted from the target device.

7. A system comprising:
   a processor; and
   a memory that contains instructions that are readable by the processor to cause the processor to perform operations of:
   scanning a repository to identify an updated artifact stored in the repository, the updated artifact storing data for running a neural network;
   producing a declaration that indicates that the updated artifact is to be installed on a target device;
   querying the target device to obtain state information associated with an outdated artifact stored on the target device, the outdated artifact being an earlier version of the updated artifact, wherein an outdated program installed on the target device pairs the outdated artifact with an outdated serving program for interpreting and using the updated artifact;
   determining, from a comparison between the state information and the declaration, that the outdated artifact stored on the target device is not up to date; and
   deploying, to the target device, a deployment item pairing the updated artifact with an updated serving program for interpreting and using the data stored by the updated artifact to run the neural network, the deployment item prompting installation of both the updated artifact and the updated serving program to run the neural network as a new program on the target device.

8. The system of claim 7, wherein the updated serving program is separate and distinct from the updated artifact.

9. The system of claim 7, wherein the instructions for producing the declaration include instructions for:
   preparing the declaration in accordance with policy configuration information.

10. The system of claim 7, wherein the instructions further cause the processor to perform the operation of:
    querying the target device to obtain updated state information after deploying the deployment item.

11. The system of claim 10, wherein the instructions further cause the processor to perform the operation of:
    determining that the target device includes an extraneous artifact based on the updated state information and the policy configuration information.

12. The system of claim 11, wherein the extraneous artifact is deleted from the target device.

13. A hardware storage device comprising instructions that are readable by a processor to cause the processor to perform operations of:

scanning a repository to identify an updated artifact stored in the repository, the updated artifact storing data for running a neural network;

producing a declaration that indicates that the updated artifact is to be installed on a target device;

querying the target device to obtain state information associated with an outdated artifact stored on the target device, the outdated artifact being an earlier version of the updated artifact, wherein an outdated program installed on the target device pairs the outdated artifact with an outdated serving program for interpreting and using the updated artifact;

determining, from a comparison between the state information and the declaration, that the outdated artifact stored on the target device is not up to date; and deploying, to the target device, a deployment item pairing the updated artifact with an updated serving program for interpreting and using the data stored by the updated artifact to run the neural network, the deployment item prompting installation of both the updated artifact and the updated serving program to run the neural network as a new program on the target device.

14. The hardware storage device of claim 13, wherein the updated serving program is separate and distinct from the updated artifact.

15. The hardware storage device of claim 13, wherein the instructions for producing the declaration include instructions for:

preparing the declaration in accordance with policy configuration information.

16. The hardware storage device of claim 13, wherein the instructions further cause the processor to perform the operation of:

querying the target device to obtain updated state information after deploying the deployment item.

17. The hardware storage device of claim 16, wherein the instructions further cause the processor to perform the operation of:

determining that the target device includes an extraneous artifact based on the updated state information and the policy configuration information.

18. The hardware storage device of claim 17, wherein the extraneous artifact is deleted from the target device.

* * * * *